US012741466B2

(12) United States Patent
Kawai et al.

(10) Patent No.: US 12,741,466 B2
(45) Date of Patent: Sep. 22, 2026

(54) WIPER UNIT

(71) Applicant: MIMAKI ENGINEERING CO., LTD., Nagano (JP)

(72) Inventors: Tomoya Kawai, Nagano (JP); Soichiro Takehana, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 130 days.

(21) Appl. No.: 18/701,606

(22) PCT Filed: Oct. 20, 2022

(86) PCT No.: PCT/JP2022/039051

§ 371 (c)(1),
(2) Date: Apr. 15, 2024

(87) PCT Pub. No.: WO2023/068321

PCT Pub. Date: Apr. 27, 2023

(65) Prior Publication Data

US 2025/0091349 A1 Mar. 20, 2025

(30) Foreign Application Priority Data

Oct. 20, 2021 (JP) ................................ 2021-171723
Oct. 20, 2021 (JP) ................................ 2021-171917

(51) Int. Cl.
*B41J 2/165* (2006.01)

(52) U.S. Cl.
CPC ................................ *B41J 2/16535* (2013.01)

(58) Field of Classification Search
None
See application file for complete search history.

(56) References Cited

U.S. PATENT DOCUMENTS

2013/0120496 A1* 5/2013 Nakamura ........... B41J 2/16552
347/33

FOREIGN PATENT DOCUMENTS

| | | |
|---|---|---|
| JP | 2006007577 | 1/2006 |
| JP | 5899841 | 4/2016 |
| JP | 6014992 | 10/2016 |
| JP | 2019043031 | 3/2019 |
| JP | 2020203441 | 12/2020 |
| JP | 2020203442 | 12/2020 |

OTHER PUBLICATIONS

Translation of Publication JP2020203441A, Inventor Toshiki Kitazawa, Assignee Mimaki Engineering Co Ltd (Year: 2020).*

(Continued)

*Primary Examiner* — Alejandro Valencia
(74) *Attorney, Agent, or Firm* — JCIPRNET

(57) ABSTRACT

Provided is a wiper unit capable of simplifying a mechanism. The wiper unit includes a wiping body extending in a band shape, a housing on which the wiping body is placed and provided to be movable in a predetermined direction, a conveyance mechanism that moves the housing in the predetermined direction, and a transmission mechanism that transmits a moving force of the housing in the predetermined direction and converts the moving force into a moving force of moving the wiping body.

5 Claims, 18 Drawing Sheets

(56) References Cited

OTHER PUBLICATIONS

"Office Action of Japan Counterpart Application, Application No. 2021171723", issued on Apr. 1, 2025, with English translation thereof, p. 1-p. 9.
"Office Action of Japan Counterpart Application, Application No. 2021171917", issued on Apr. 1, 2025, with English translation thereof, p. 1-p. 13.
"International Search Report (Form PCT/ISA/210) of PCT/JP2022/039051", mailed on Jan. 10, 2023, with English translation thereof, pp. 1-5.

* cited by examiner

WIPER UNIT

CROSS-REFERENCE TO RELATED APPLICATION

This application is a 371 application of the International PCT application serial no. PCT/JP2022/039051 filed on Oct. 20, 2022, which claims the priority benefit of Japan Patent Application No. 2021-171917 filed on Oct. 20, 2021 and Japan Patent Application No. 2021-171723 filed on Oct. 20, 2021. The entirety of each of the above-mentioned patent applications is hereby incorporated by reference herein and made a part of this specification.

TECHNICAL FIELD

The present invention relates to a wiper unit.

BACKGROUND ART

In a device having a jet head that ejects liquid, a wiper unit that wipes the liquid attached to the jet head is provided. For example, a wiper unit that is movable between a standby position and a wiping position and includes a wiping body wound in a roll shape and a drive mechanism that delivers the wiping body is known (see, for example, Patent Literature 1).

Further, in a device having a jet head that ejects liquid, a wiper unit that wipes the liquid attached to the jet head is provided. For example, there is known a wiper unit in which a cassette on which a wiping member for wiping liquid is mounted is attached to and detached from a housing to replace the wiping member with the cassette (see, for example, Patent Literature 2).

CITATION LIST

Patent Literature

Patent Literature 1: Japanese Patent No. 6014992
Patent Literature 2: Japanese Patent No. 5899841

SUMMARY OF INVENTION

Technical Problems

In the configuration of Patent Literature 1, it is necessary to separately provide a drive system for moving the unit between the standby position and the wiping position and a drive system for feeding out the wiping body, and thus the mechanism becomes complicated.

The present invention has been made in view of the above, and an object thereof is to provide a wiper unit capable of simplifying a mechanism.

In addition, in the configuration of Patent Literature 2, since the wiping member is handled in units of cassettes, the running cost increases.

The present invention has been made in view of the above, and an object thereof is to provide a wiper unit capable of suppressing running cost.

Solutions to Problems

A wiper unit according to the present invention includes: a wiping body extending in a band shape; a housing on which the wiping body is placed and which is provided so as to be movable in a predetermined direction; a drive mechanism that moves the housing in the predetermined direction; and a transmission mechanism that converts a moving force of the housing in the predetermined direction into a moving force for moving the wiping body.

In the wiper unit described above, the housing includes a conveying roller that conveys the wiping body by rotation, the drive mechanism includes a rack gear disposed along the predetermined direction and a pinion gear meshing with the rack gear, and the transmission mechanism is capable of transmitting rotation of the pinion gear to the conveying roller.

In the wiper unit described above, the transmission mechanism includes a relay portion capable of switching between a transmission state in which rotation of the pinion gear is transmitted to the conveying roller and a non-transmission state in which rotation of the pinion gear is not transmitted to the conveying roller.

In the wiper unit, the transmission mechanism transmits rotation to the conveying roller so as to convey the wiping body in one direction.

In the wiper unit described above, the transmission mechanism includes a planetary gear disposed at a transmission position at which rotation of the pinion gear is transmitted to the conveying roller when the pinion gear rotates in a first direction, and disposed at a non-transmission position at which the planetary gear does not mesh with the pinion gear when the pinion gear rotates in a second direction opposite to the first direction, and the relay portion is the planetary gear.

In the wiper unit, the housing reciprocates between a standby position and a wiping position where a wiping operation is performed, the first direction is a rotation direction when the housing moves from the wiping position to the standby position, and the second direction is a rotation direction when the housing moves from the standby position to the wiping position.

In the wiper unit described above, the rotation of the conveying roller is restricted when the wiping body is fed to a proximal end, and the wiper unit further includes: a detection mechanism configured to detect that rotation of the conveying roller is restricted.

A wiper unit according to the present invention includes: a wiping unit having a roll-shaped wiping body: a housing having an opening in an upper portion through which the wiping unit can be taken in and out, the housing having a housing-side roller disposed so as to partially protrude upward from the opening, the housing accommodating the wiping unit in a state where a part of the wiping body is hooked on the housing-side roller from above; and a lid body including a lid-body-side roller that covers the opening so as to expose the wiping body hooked on the housing-side roller to an outside, and conveys the wiping body in a state of covering the opening.

In the wiper unit described above, the wiping unit includes: a feeding roller rotatably supported by the housing, to which a proximal end of the wiping body is fixed, and that feeds out the wiping body to the housing-side roller; and a winding roller rotatably supported by the housing, to which a distal end of the wiping body is fixed, and which winds the wiping body from the housing-side roller.

In the wiper unit, the winding roller includes a winding-side gear rotatable integrally with the winding roller, and the lid-body-side roller includes a lid body roller gear that rotates integrally with the lid-body-side roller and is connected to the winding-side gear so as to rotate in conjunction with the winding-side gear.

In the wiper unit, the housing is movable in a predetermined direction, and the wiper unit further includes: a rack gear disposed along the predetermined direction; a pinion gear that meshes with the rack gear; and a transmission mechanism capable of transmitting rotation of the pinion gear to the lid body roller gear.

In the wiper unit, the wiping body is a nonwoven fabric.

In the wiper unit, the lid is attached to the housing via a hinge.

Effect of the Invention

According to the present invention, it is possible to provide a wiper unit capable of simplifying a mechanism.

Further, according to the present invention, it is possible to provide a wiper unit capable of suppressing running cost.

DESCRIPTION OF EMBODIMENTS

Figure 1:
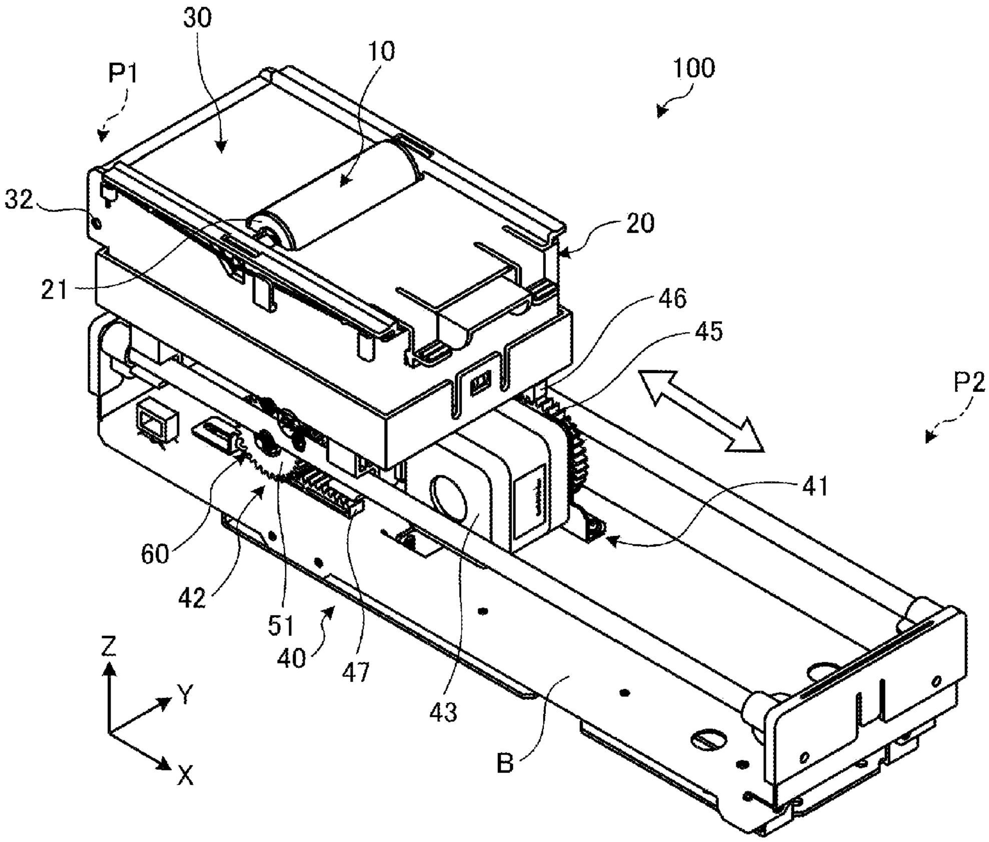
FIG. 1 is a perspective view illustrating an example of a wiper unit according to the present embodiment.

Hereinafter, an embodiment of a wiper unit according to the present invention will be described with reference to the drawings. Note that the present invention is not limited by the embodiment. In addition, constituent elements in the following embodiments include those that can be easily replaced by those skilled in the art or those that are substantially the same.

In the present embodiment, directions in the drawing will be described using an XYZ coordinate system. In the XYZ coordinate system, a plane parallel to a floor surface on which the wiper unit is placed when the wiper unit is used is an XY plane. In the XY plane, a moving direction of a housing 20 described later is referred to as an X direction, and a direction orthogonal to the X direction on the XY plane is referred to as a Y direction. A direction perpendicular to the XY plane is referred to as a Z direction. In each of the X direction, the Y direction, and the Z direction, it is assumed that a direction of an arrow in the drawing is a +direction, and a direction opposite to the direction of the arrow is a −direction.

Figure 2:
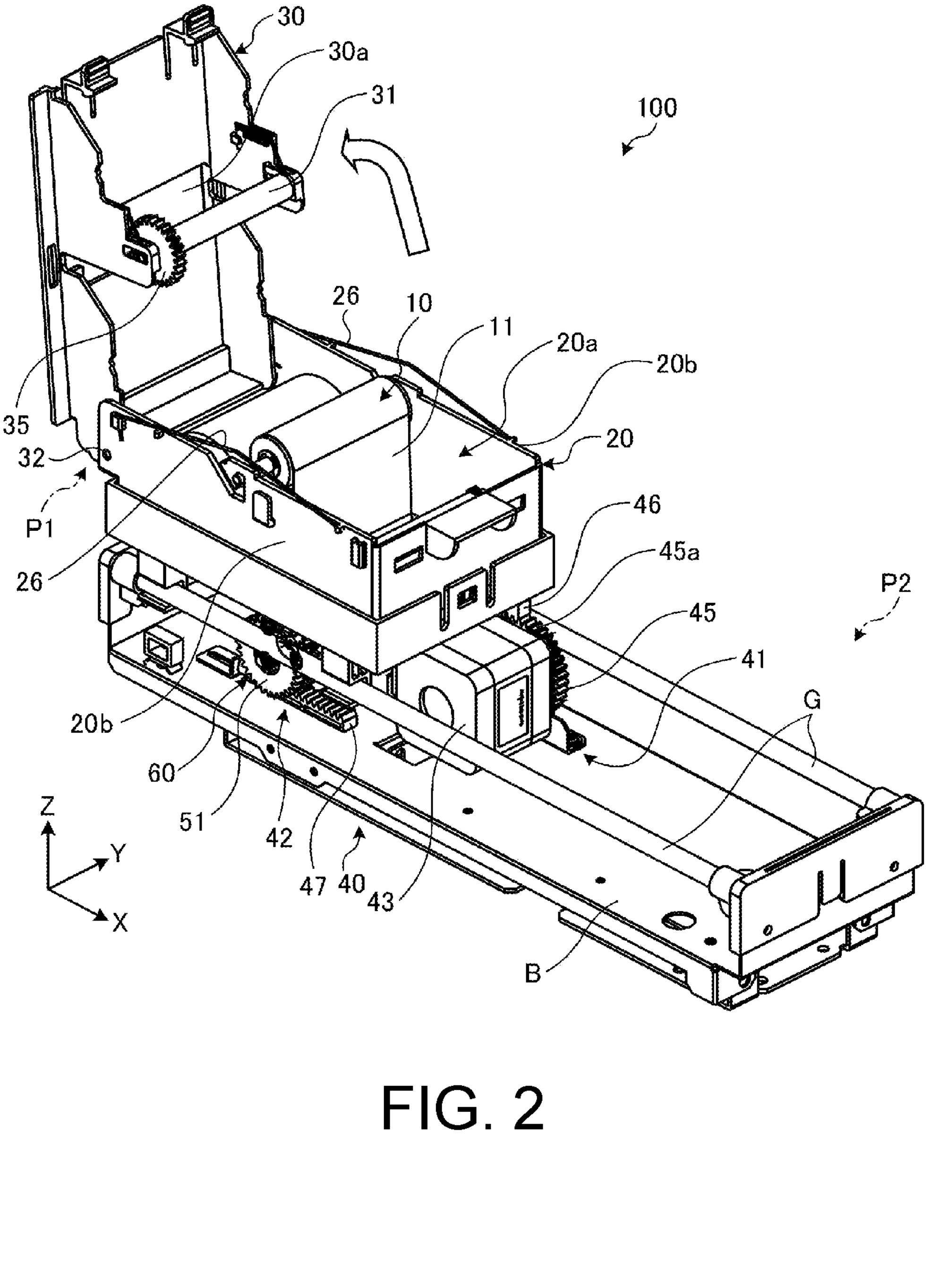
FIG. 2 is a perspective view illustrating an example of the wiper unit according to the present embodiment.

FIGS. 1 and 2 are perspective views illustrating an example of a wiper unit 100 according to the present embodiment. FIG. 1 illustrates a state in which a lid body 30 is closed, and FIG. 2 illustrates a state in which the lid body 30 is opened. As illustrated in FIGS. 1 and 2, the wiper unit 100 includes a wiping unit 10, a housing 20, a lid body 30, a drive mechanism 40, and a control unit (not illustrated). The wiper unit 100 is mounted on a device including a jet head that jets liquid, such as a printing device, and wipes liquid attached to the jet head.

The wiping unit 10 includes a wiping body 11, a feeding roller 12, and a winding roller 13. The wiping unit 10 holds or adsorbs the liquid attached to the jet head. In the present embodiment, the wiping body 11 is formed in a sheet shape. As such a wiping body 11, for example, a nonwoven fabric is used. Other materials may be used as the wiping body 11.

Figure 3:
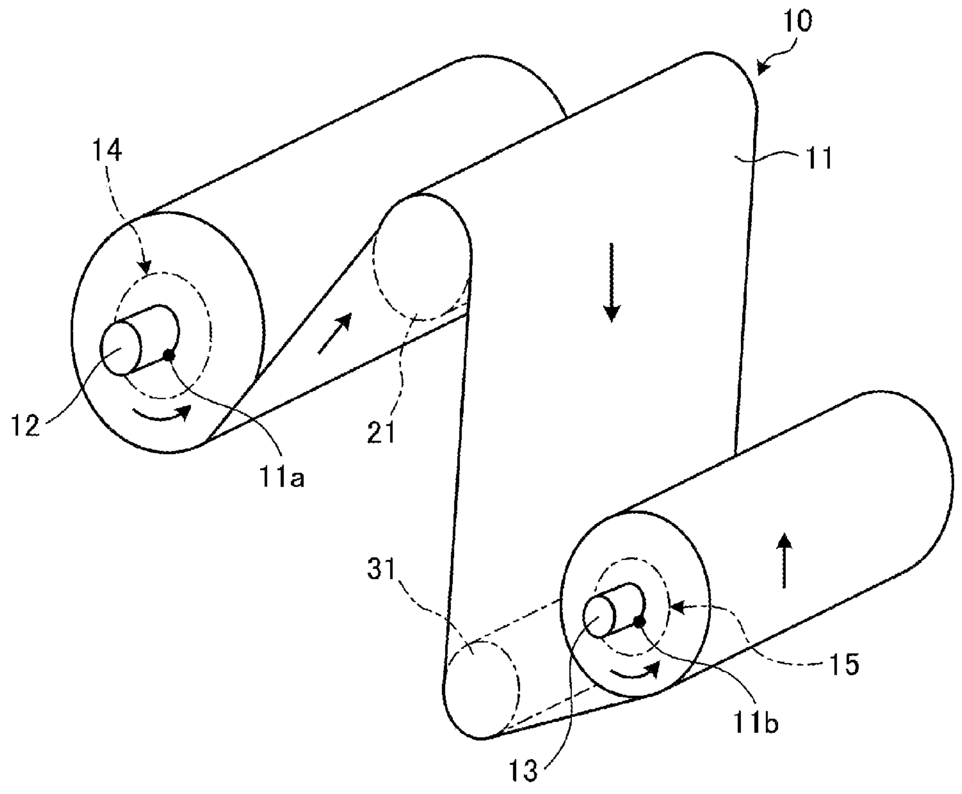
FIG. 3 is a perspective view illustrating an example of a wiping unit.

FIG. 3 is a perspective view illustrating an example of the wiping unit 10. The wiping body 11 is provided in a state where a proximal end portion 11*a* is fixed to the feeding roller 12 and a distal end portion 11*b* is fixed to the winding roller 13. In the initial state, the wiping body 11 is in a state in which the proximal end portion 11*a* side is wound around the feeding roller 12 and the distal end portion 11*b* side is fixed without being wound around the winding roller 13. Each time the wiping operation is performed from this state, the wiping body 11 is wound by the winding roller 13, and accordingly, the wiping body 11 is fed from the feeding roller 12. Note that the wiping body 11 may have a configuration in which the distal end portion 11*b* is, for example, a free end, is fed by a housing-side roller and a lid-body-side roller described later, and is wound by the winding roller 13.

The wiping unit 10 can integrally handle the wiping body 11, the feeding roller 12, and the winding roller 13. The wiping unit 10 can be attached to and detached from the housing 20 by integrating the wiping body 11, the feeding roller 12, and the winding roller 13. When the wiping unit 10 is attached to the housing 20, the feeding roller 12 is rotatably supported by a feeding-side bearing 22 of the housing 20 described later, and the winding roller 13 is rotatably supported by a winding-side bearing 23 of the housing 20 described later.

The feeding roller 12 is provided with a feeding-side gear 14. The feeding roller 12 is rotatable integrally with the feeding-side gear 14. The winding roller 13 is provided with a winding-side gear 15. The winding roller 13 is rotatable integrally with the winding-side gear 15. The winding-side gear 15 meshes with a transmission gear 25 to be described later in a state of being supported by the winding-side bearing 23, and rotates in conjunction with the rotation of the transmission gear 25.

Figure 4:
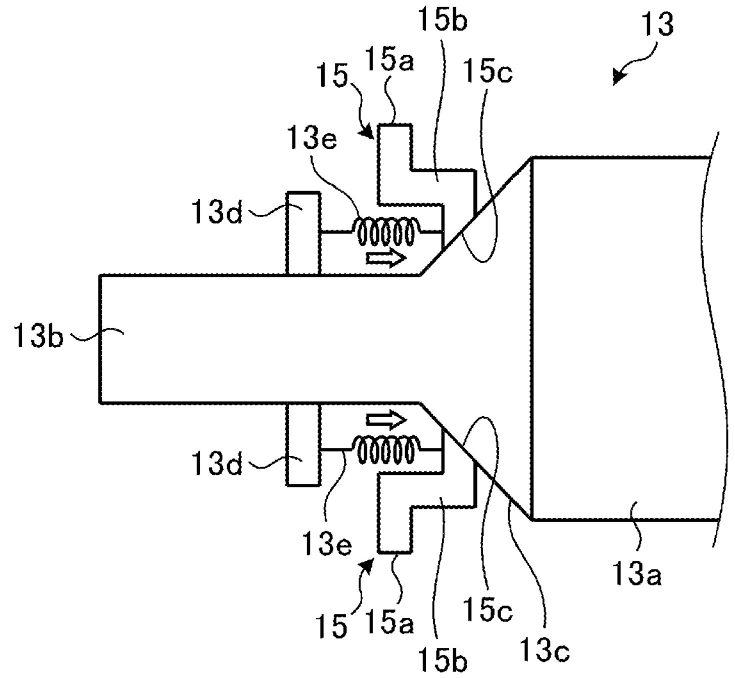
FIG. 4 is a view illustrating an example of a winding roller and a winding-side gear.

FIG. 4 is a view illustrating an example of the winding roller 13 and the winding-side gear 15. FIG. 4 illustrates a cross-sectional configuration by a plane parallel to the YZ plane. As illustrated in FIG. 4, the winding roller 13 includes a wiping body holding portion 13*a*, a supported portion 13*b*, a tapered surface 13*c*, an elastic member support portion 13*d*, and an elastic member 13*e*.

The wiping body holding portion 13*a* has, for example, a cylindrical shape or a columnar shape, and is a portion around which the wiping body 11 is wound. The supported portion 13*b* is a portion supported by the winding-side bearing 23 of the housing 20. The tapered surface 13*c* is a portion connecting the wiping body holding portion 13*a* and the supported portion 13*b*, and has a tapered shape reduced in diameter from the wiping body holding portion 13*a* toward the supported portion 13*b*.

The winding-side gear 15 includes an annular portion 15*a* having teeth formed on the outer peripheral side, and a connecting portion 15*b* extending from the annular portion 15*a* toward the tapered surface 13*c*. The connecting portion 15*b* has a facing surface 15*c* facing the tapered surface 13*c*. The winding-side gear 15 is held in a state where the facing surface 15*c* is in contact with the tapered surface 13*c*.

The elastic member support portion 13*d* has, for example, a plate shape and is provided in the supported portion 13*b*. The elastic member 13*e* is supported by the elastic member support portion 13*d*, and applies elastic force to the tapered surface 13*c* side with respect to the connecting portion 15*b* of the winding-side gear 15. The winding-side gear 15 is held by the winding roller 13 by the elastic force received from the elastic member 13*e*. As the winding-side gear 15 rotates, a frictional force is generated between the facing surface 15*c* and the tapered surface 13*c*, and the winding roller 13 rotates by this frictional force.

In the use state of the wiping unit 10, tension is applied to the winding roller 13 from the wiping body 11. Therefore, when the tension of the wiping body 11 is larger than the frictional force between the facing surface 15*c* and the tapered surface 13*c*, the winding-side gear 15 idles with respect to the winding roller 13. For example, in a case where the diameter of the wiping body 11 wound around the winding roller 13 is larger than the diameter of a lid-body-side roller 31 to be described later, when the lid-body-side roller 31 and the winding roller 13 are rotated by the same angle, the moving length of the outer periphery of the wiping body 11 wound around the winding roller 13 becomes larger than the moving length of the outer periphery of the lid-body-side roller 31. Therefore, the wiping body 11 is pulled from the winding roller 13 side. In such a case, since the tension acting on the winding roller 13 is larger than the elastic force of the elastic member 13*e*, the winding-side gear 15 idles with respect to the winding roller 13. In this manner, the amount of rotation of the winding-side gear 15 and the amount of rotation of the winding roller 13 are adjusted in accordance with the winding status of the wiping body 11 by the winding roller 13.

The feeding roller 12 and the feeding-side gear 14 provided on the feeding roller 12 also have the same configurations as those of the winding roller 13 and the winding-side gear 15 described above. Rotation of the feeding-side gear 14 is restricted by a stopper 24 provided in the housing 20 described later. Therefore, looseness or the like of the wiping body 11 in the feeding roller 12 can be suppressed. In this configuration, when the wiping body 11 is wound by the winding roller 13, the tension from the wiping body 11 acts on the feeding roller 12. Due to this tension, the feeding roller 12 rotates so as to idle with respect to the feeding-side gear 14, whereby the wiping body 11 is fed out.

The housing 20 accommodates the wiping unit 10 including the wiping body 11 so as to be taken out. The housing 20 has, for example, a rectangular parallelepiped box shape in which the X direction is the longitudinal direction, and has an opening 20*a* at the upper end in the Z direction. The opening 20*a* is an opening through which the wiping unit 10 including the wiping body 11 can be taken in and out.

Figure 5:
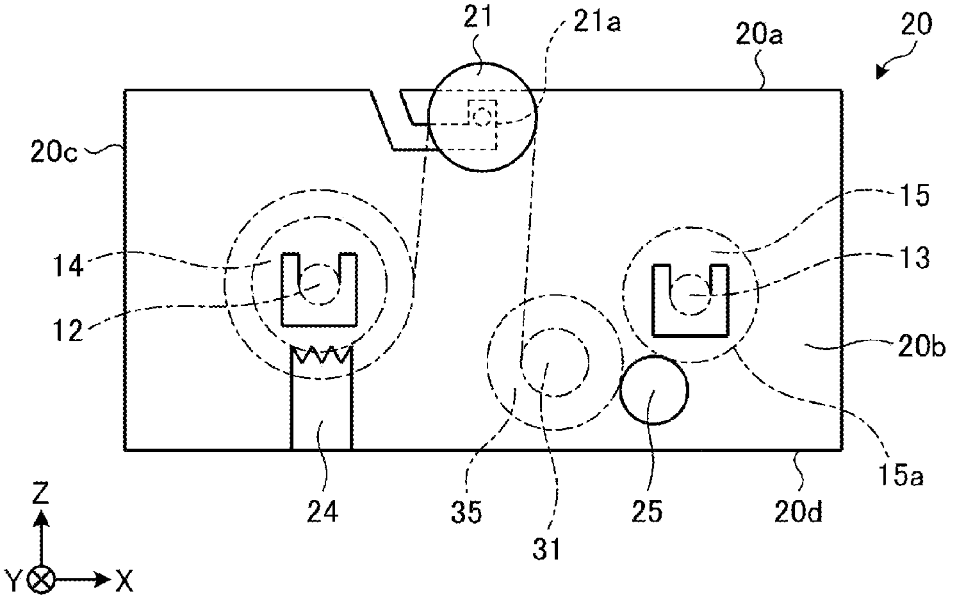
FIG. 5 is a view illustrating an example of an internal configuration of a housing.

FIG. 5 is a view illustrating an example of an internal configuration of the housing 20. The housing 20 includes a housing-side roller 21, a feeding-side bearing 22, a winding-side bearing 23, a stopper 24, and a transmission gear 25. The housing-side roller 21 includes a roller shaft 21*a*. The roller shaft 21*a* is disposed along the Y direction. Both ends of the roller shaft 21*a* in the Y direction protrude from the housing-side roller 21. The housing-side roller 21 is rotatably supported by wall portions 20*b* at both ends in the Y direction of the housing 20 by using a roller shaft 21*a*. The housing-side roller 21 is rotatable about a rotation axis parallel to the Y direction. The housing-side roller 21 is disposed such that a part thereof protrudes upward (+Z direction) from the opening 20*a*. The housing-side roller 21 supports the wiping body 11 in a state where a part of the wiping body 11 is hooked on the upper side (+Z side). The housing 20 accommodates the wiping unit 10 in a state where a part of the wiping body 11 is hooked on the housing-side roller 21 from the upper side (+Z side).

Figure 6:
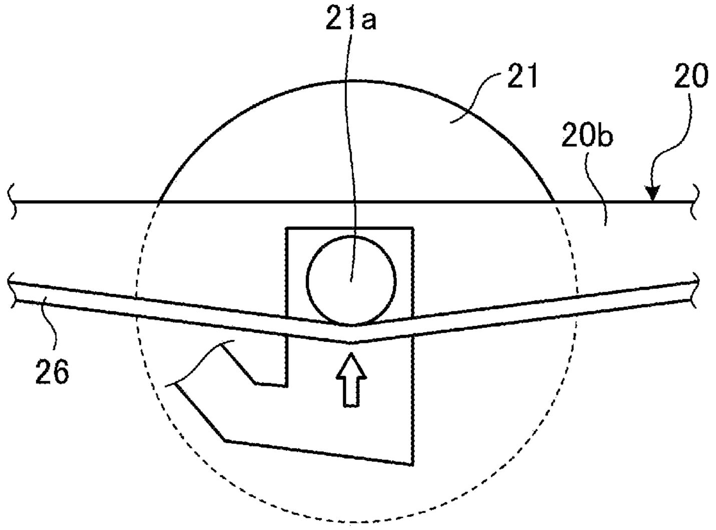
FIG. 6 is an enlarged view illustrating a configuration of a part of the housing.

FIG. 6 is an enlarged view illustrating a configuration of a part of the housing 20. As illustrated in FIG. 6, for example, the housing-side roller 21 is disposed so as to be movable in the Z direction in a state where an elastic force is applied to the roller shaft 21*a* upward (+Z direction) by a linear spring 26. The housing-side roller 21 supports the wiping body 11 in the Z direction with a lid-body-side roller (conveying roller) 31 to be described later. When the housing-side roller 21 is pushed by the lid-body-side roller 31 and moves in the −Z direction, a force in the +Z direction can be applied to the lid-body-side roller 31 by the linear spring 26.

The feeding-side bearing 22 rotatably supports the feeding roller 12. The feeding-side bearings 22 are disposed on the wall portions 20*b* at both ends in the Y direction of the housing 20. An upper portion (+Z-side end portion) of the feeding-side bearing 22 is opened, and the feeding roller 12 can be inserted and removed in the Z direction.

The winding-side bearing 23 rotatably supports the winding roller 13. The winding-side bearings 23 are disposed on the wall portions 20*b* at both ends in the Y direction of the housing 20. An upper portion (+Z-side end portion) of the winding-side bearing 23 is opened, and the winding roller 13 can be inserted and removed in the Z direction.

The stopper 24 meshes with the feeding-side gear 14 in a state where the feeding roller 12 is supported by the feeding-side bearing 22. The stopper 24 is fixed to a bottom 20*d* of the housing 20 and restricts the rotation of the feeding-side gear 14.

The transmission gear 25 meshes with the winding-side gear 15 in a state where the winding roller 13 is supported by the winding-side bearing 23. Further, the transmission gear 25 meshes with a lid body roller gear 35 when the lid body 30 described later is in a closed state. The transmission gear 25 transmits the rotation transmitted from the drive mechanism 40 to be described later to the winding-side gear 15 and the lid body roller gear 35.

The lid body 30 is provided so as to be able to open and close the opening 20*a* of the housing 20. The lid body 30 is attached to a wall portion 20*c* on-X side of the housing 20 via a hinge 32. The lid body 30 is provided to be rotatable about the Y axis with the wall portion 20*c* as a fulcrum by the hinge 32. The lid body 30 covers the opening 20*a* so as to expose the wiping body 11 hooked on the housing-side roller 21 to the outside.

The lid body 30 includes a lid-body-side roller (conveying roller) 31 that supports the wiping body 11 while covering the opening 20*a*. The lid-body-side roller 31 is disposed below (−Z side) the housing-side roller 21 in a closed state where the lid body 30 covers the opening 20*a*. The surface of the wiping body 11 on the +Z side in the state of being supported by the housing-side roller 21, that is, the surface facing the jetting surface of the jetting head or the like is hooked on the lid-body-side roller 31. The lid-body-side roller 31 supports the wiping body 11 and conveys the wiping body toward the winding roller 13. The lid-body-side roller 31 is made of a material whose surface in contact with the wiping body 11 easily generates a frictional force with the wiping body 11, for example, a foamed material such as sponge, but is not limited thereto.

The lid-body-side roller 31 includes a lid body roller gear 35 that rotates integrally with the lid-body-side roller 31. When the lid body 30 is closed, the lid body roller gear 35 meshes with the transmission gear 25 described above and rotates in conjunction with the rotation of the transmission gear 25.

Figure 7:
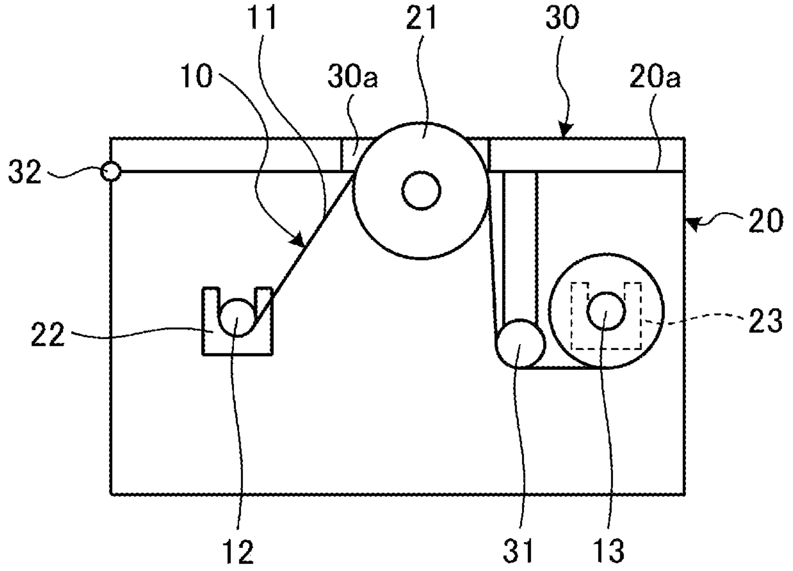
FIG. 7 is a view illustrating an example of a replacement process of a wiping unit.

Here, a procedure for replacing the wiping unit 10 will be described. FIGS. 7 to 11 are views illustrating an example of a replacement process of the wiping unit 10. As illustrated in FIG. 7, by repeatedly using the wiper unit 100, the wiping body 11 is wound around the winding roller 13. When the entire wiping body 11 is wound, the wiping body 11 needs to be replaced.

Figure 8:
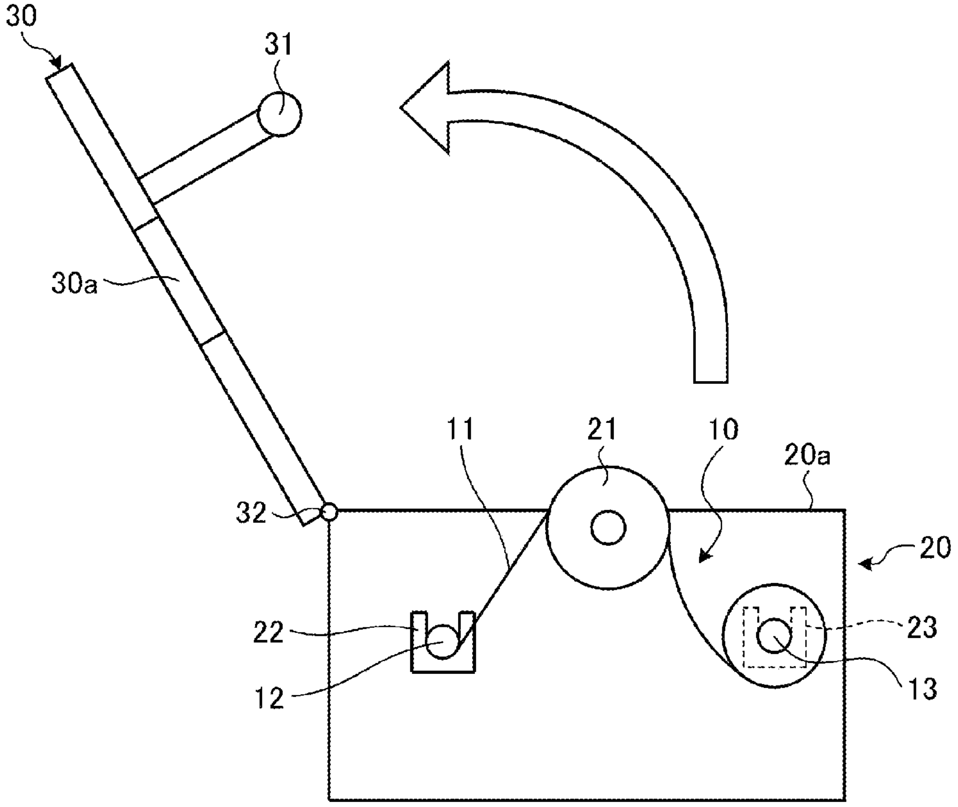
FIG. 8 is a view illustrating an example of a replacement process of a wiping unit.

In this case, as illustrated in FIG. 8, the operator opens the lid body 30. The lid body 30 is opened by being rotated about the Y axis by the hinge 32 about the upper portion of the wall portion 20*c* on the −X side of the housing 20. When the lid body 30 is opened, the opening 20*a* of the housing 20 is opened, and the lid-body-side roller 31 that has pressed the wiping body 11 downward (−Z side) in the housing 20 is separated from the wiping body 11. As a result, the inside of the housing 20 can be accessed from the opening 20*a*.

Figure 9:
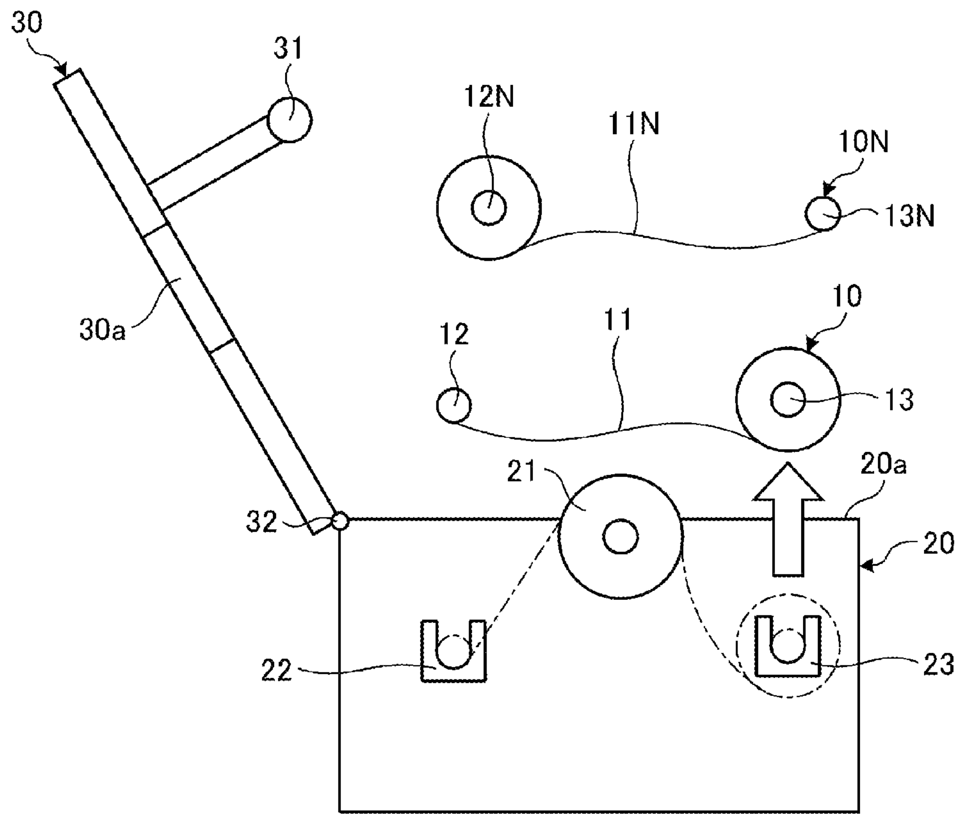
FIG. 9 is a view illustrating an example of a replacement process of a wiping unit.

Next, the wiping unit 10 supported by the housing 20 is taken out. In this case, the feeding roller 12 around which the wiping body 11 is not wound is removed from the feeding-side bearing 22, and the winding roller 13 around which the used wiping body 11 is wound is removed from the winding-side bearing 23. Then, as illustrated in FIG. 9, the wiping body 11, the feeding roller 12, and the winding roller 13 are taken out integrally from the opening 20*a*.

Figure 10:
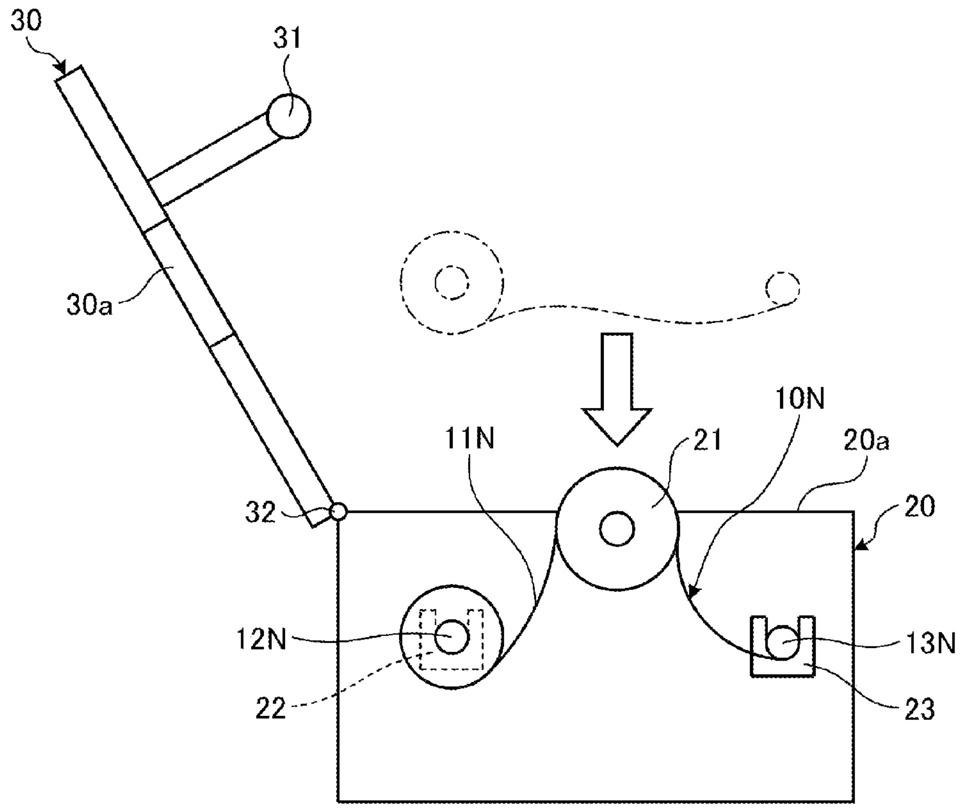
FIG. 10 is a view illustrating an example of a replacement process of a wiping unit.

Next, as illustrated in FIG. 10, a new wiping unit 10N is attached to the housing 20. In this case, a wiping body 11N, a feeding roller 12N, and a winding roller 13N of the new wiping unit 10N are integrally inserted into the housing 20 from the opening 20*a*. Then, the wiping body 11N is hooked on the upper portion of the housing-side roller 21, the feeding roller 12N in a state in which an unused wiping body 11 is wound is supported by the feeding-side bearing 22, and the winding roller 13N in a state in which the wiping body 11 is not wound is supported by the winding-side bearing 23. As a result, a new wiping unit 10N is attached to the housing 20.

Figure 11:
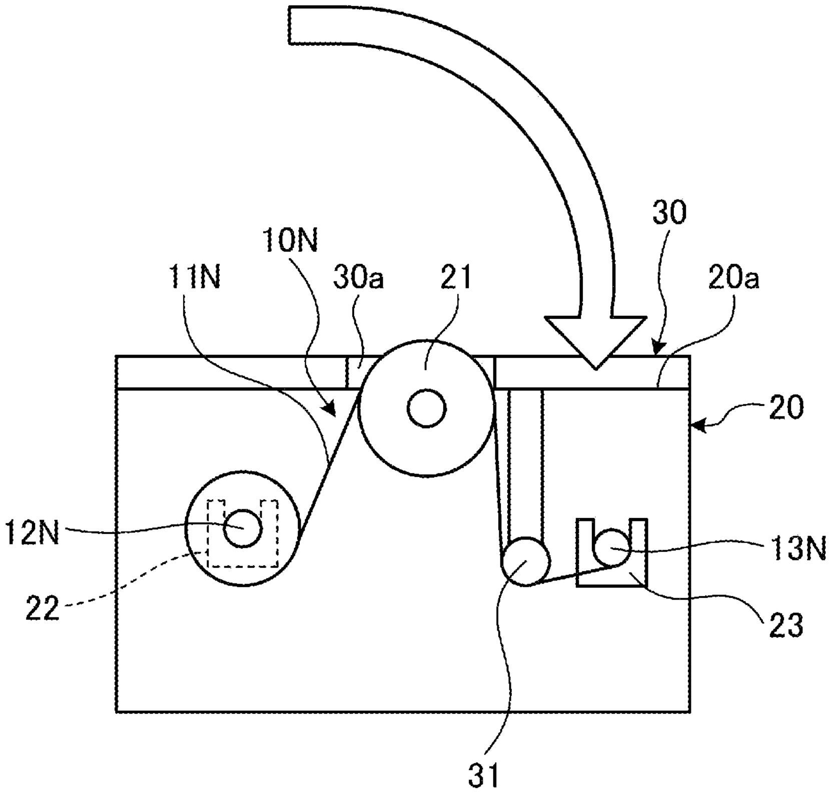
FIG. 11 is a view illustrating an example of a replacement process of a wiping unit.

After the new wiping unit 10N is attached, the lid body 30 is brought into a closed state as illustrated in FIG. 11. By closing the lid body 30, the opening 20*a* is covered with the lid body 30, and the wiping body 11N supported by the housing-side roller 21 protrudes upward from an opening window 30*a*. In the present embodiment, the position of the roller shaft 21*a* in the vertical direction is set such that only the wiping body 11N protrudes upward from the opening window 30*a* on the upper surface of the lid body 30. Further, inside the housing 20, the lid-body-side roller 31 of the lid body 30 pushes down the wiping body 11N, and tension is generated in the wiping body 11N. As a result, replacement of the wiping unit 10 is completed.

Here, in a state where the lid body 30 is closed, the lid-body-side roller 31 is disposed closer to the wiping unit 10 than the winding roller 13. As a result, tension is applied to the wiping body 11N, and the lead-out angle of the wiping body 11 from the housing-side roller 21 toward the winding roller 13 is kept constant by the lid-body-side roller 31. According to this configuration, since the wiping body 11 after wiping is carried away from the housing-side roller 21 at a constant angle regardless of the winding diameter of the winding roller 13, there is no possibility that the contaminated wiping body 11 after wiping comes into contact with the opening window 30*a* to contaminate the lid body 30. In addition, since the wiping body 11 contaminated after wiping is quickly separated from the housing-side roller 21, it is also possible to reduce the possibility that contaminants generated by splashes or the like from the wiping body 11 after wiping come into contact with the jet head. The lead-out angle of the wiping body 11 from the housing-side roller 21 may be substantially in the vertical direction as illustrated in FIG. 7, and is preferably within ±30 degrees, preferably within ±20 degrees with respect to the vertical direction.

Figure 12:
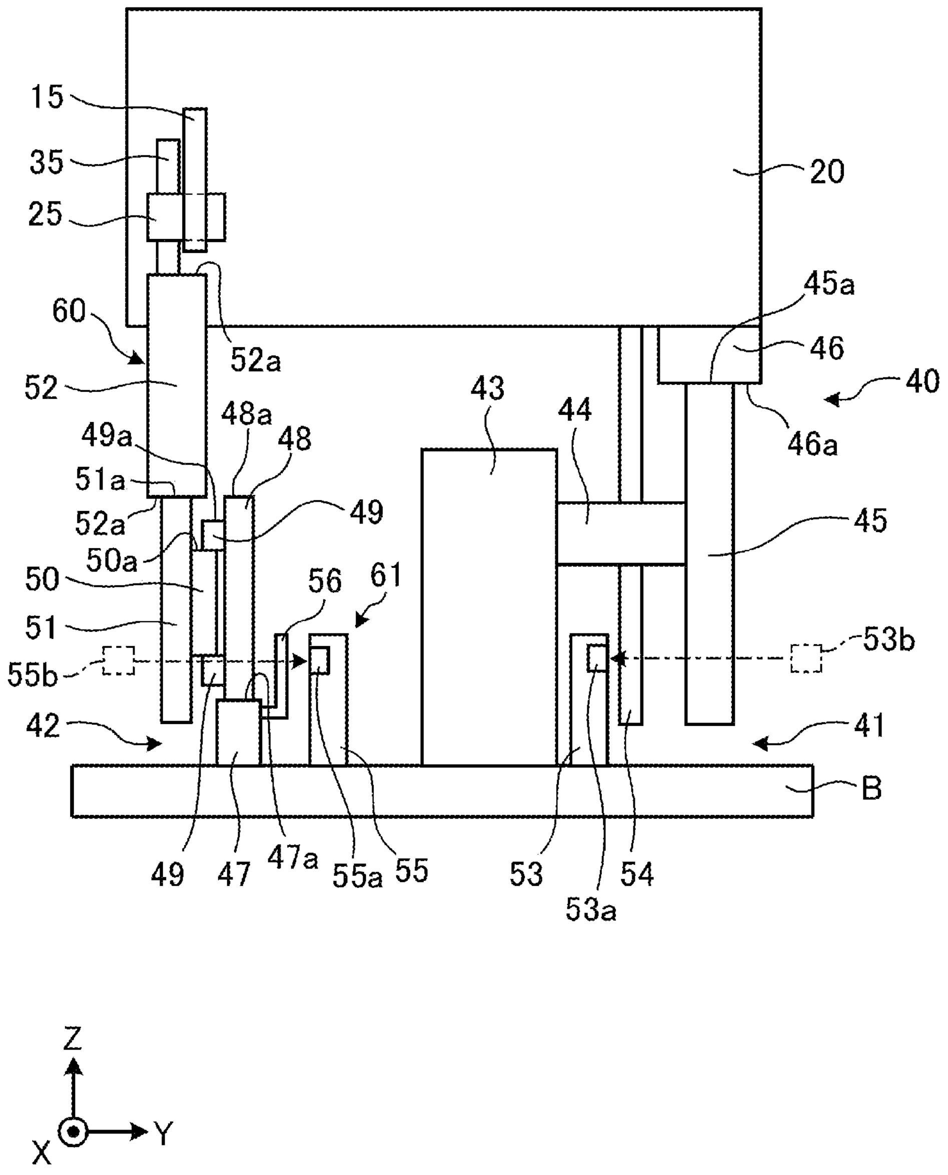
FIG. 12 is a view illustrating an example of a drive mechanism.

Next, the drive mechanism 40 will be described. FIG. 12 is a view illustrating an example of the drive mechanism 40. The drive mechanism 40 includes a moving mechanism 41 that moves the housing 20 and a conveyance mechanism 42 that conveys the wiping body 11. The drive mechanism 40 is provided on a base B disposed below (−Z direction) the housing 20.

The moving mechanism 41 includes a motor 43, an output shaft 44, a drive gear 45, and a rack gear 46. The motor 43 rotates the output shaft 44 about the Y axis under the control of the control unit. The motor 43 can rotate the output shaft 44 by switching the output shaft in opposite directions around the Y axis.

The drive gear 45 has a disk shape, is fixed to the output shaft 44, and rotates around the Y axis integrally with the output shaft 44. The drive gear 45 has a plurality of teeth 45*a* formed along the circumferential direction on the outer peripheral portion.

The rack gear 46 is fixed to the bottom of the housing 20 and is formed linearly along the X direction. The rack gear 46 has a plurality of teeth 46*a* formed along the X direction on a lower (−Z side) surface. The teeth 46*a* of the rack gear 46 mesh with the teeth 45*a* of the drive gear 45. When the drive gear 45 rotates, the rack gear 46 moves in the X direction via the teeth 45*a* and the teeth 46*a*. When the rack gear 46 moves in the X direction, the housing 20 moves in the X direction.

The moving mechanism 41 includes an optical sensor 53. The optical sensor 53 includes a detection unit 53*a* that detects light emitted from a light emitting unit 53*b* in the −Y direction. In this case, the light emitting unit 53*b* is disposed on the +Y side of the detection unit 53*a*. The light emitting unit 53*b* may be disposed on the base B or may be disposed at a position different from the base B. Note that the light emitting unit 53*b* may be disposed in the optical sensor 53, and the detection unit 53*a* may detect reflected light of light emitted from the light emitting unit 53*b*.

A plate member 54 is provided at the bottom of the housing 20. When the plate member 54 is not disposed on the +Y side of the detection unit 53*a*, light from the light emitting unit 53*b* reaches the detection unit 53*a* and is detected by the detection unit 53*a*. On the other hand, when the plate member 54 is disposed on the +Y side of the detection unit 53*a*, the light from the light emitting unit 53*b* is blocked by the plate member 54 and does not reach the detection unit 53*a*. The detection result of the detection unit 53*a* is supplied to the control unit.

Figure 13:
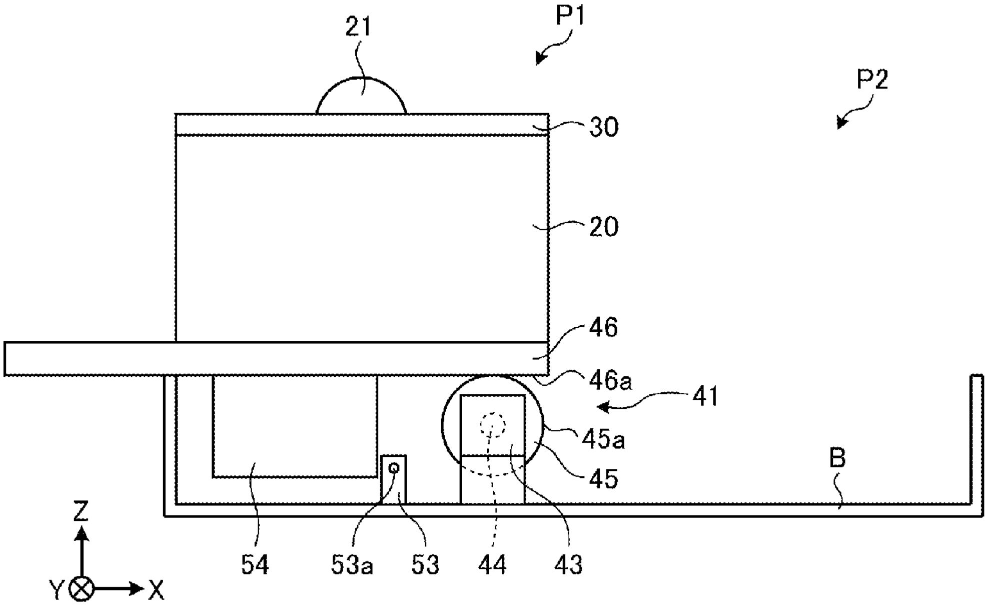
FIG. 13 is a view illustrating a state in which the housing moves.
Figure 14:
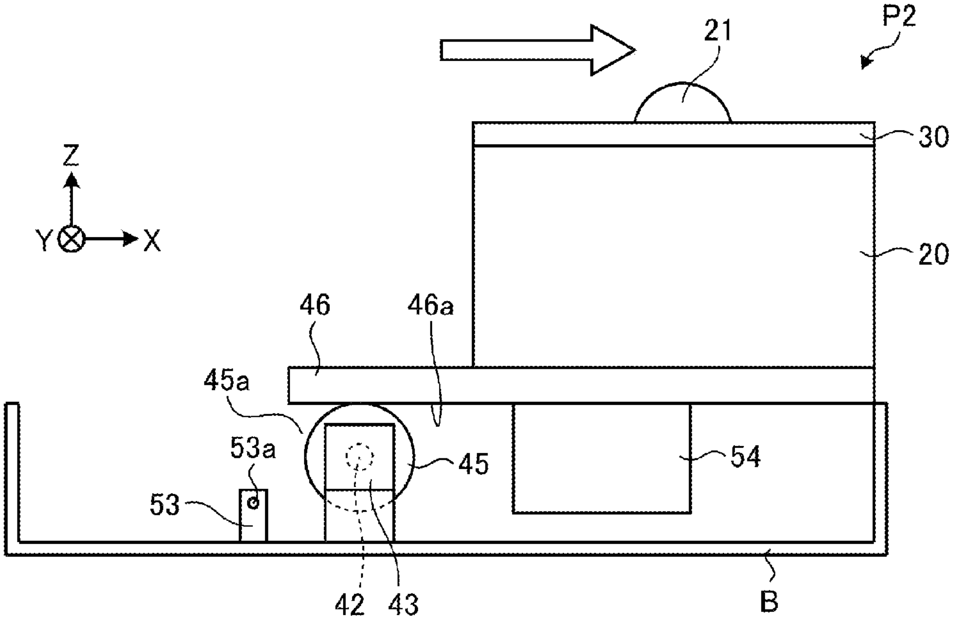
FIG. 14 is a view illustrating a state in which the housing moves.

FIGS. 13 and 14 are views illustrating a state in which the housing 20 moves. As illustrated in FIG. 13, when the motor 43 rotates from the state in which the housing 20 is disposed at a standby position P1, the rotation of the motor 43 is transmitted to the rack gear 46 via the output shaft 44 and the drive gear 45, and the rack gear 46 and the housing 20 move in the +X direction. As the rack gear 46 and the housing 20 move in the +X direction, the housing 20 is disposed at a wiping position P2 as illustrated in FIG. 14. When the motor 43 rotates in the reverse direction from the state where the housing 20 is disposed at the wiping position P2, the rotation of the motor 43 is transmitted to the rack gear 46 via the output shaft 44 and the drive gear 45, and the rack gear 46 and the housing 20 move in the −X direction. As the rack gear 46 and the housing 20 move in the −X direction, the housing 20 is disposed at the standby position P1 illustrated in FIG. 13.

Figure 15:
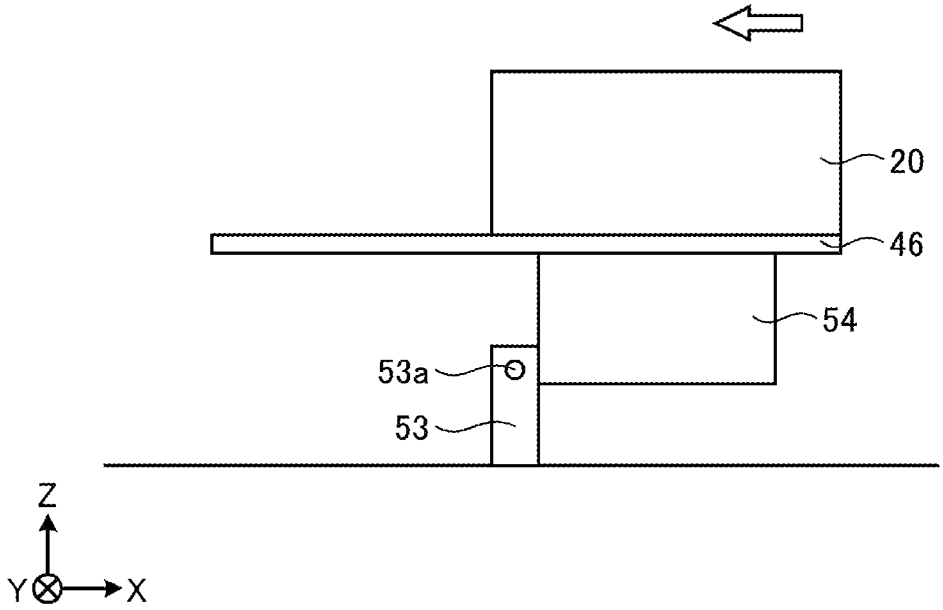
FIG. 15 is a view illustrating a state in which the housing moves, and is a view illustrating a main part.
Figure 16:
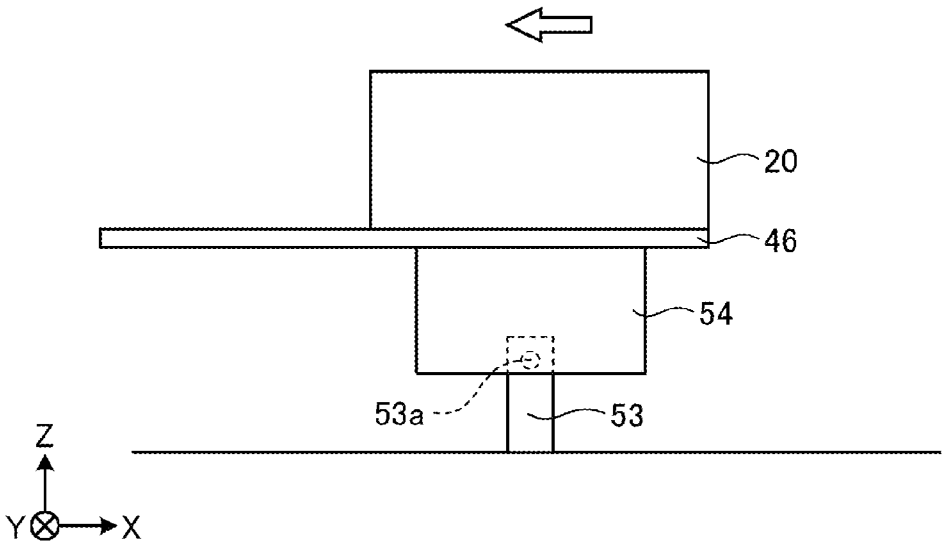
FIG. 16 is a view illustrating a state in which the housing moves, and is a view illustrating a main part.
Figure 17:
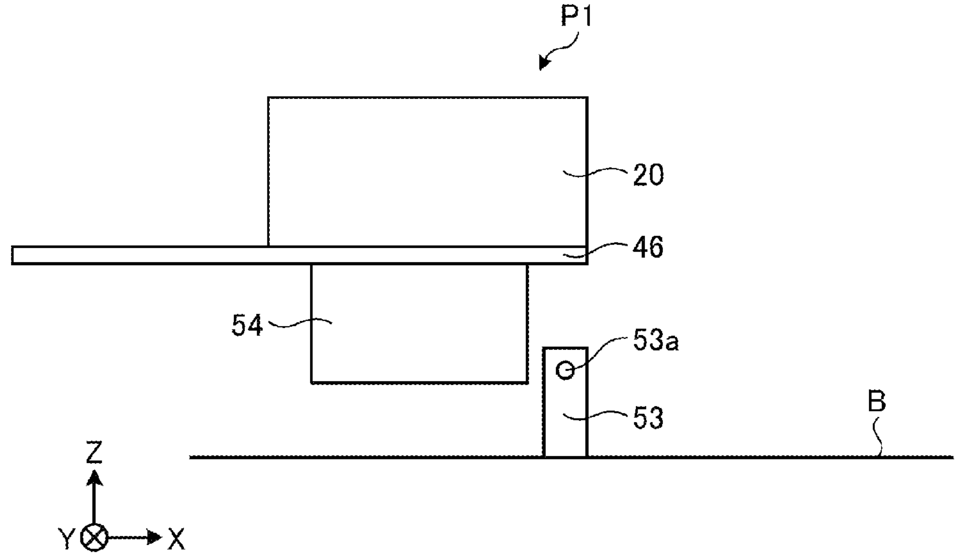
FIG. 17 is a view illustrating a state in which the housing moves, and is a view illustrating a main part.

FIGS. 15 to 17 are views illustrating a state in which the housing 20 moves, and are views illustrating main parts. When the housing 20 returns from the wiping position P2 to the standby position P1, as illustrated in FIG. 15, the plate member 54 fixed to the bottom of the housing 20 approaches the optical sensor 53. As the housing 20 further moves in the −X direction from the position illustrated in FIG. 15, the plate member 54 is disposed on the +Y side of the detection unit 53*a* of the optical sensor 53 as illustrated in FIG. 16. As a result, the light from the light emitting unit 53*b* is blocked by the plate member 54 and does not reach the detection unit 53*a*. As the housing 20 further moves in the −X direction from the position illustrated in FIG. 16, the plate member 54 is deviated from the position on the +Y side of the detection unit 53*a* as illustrated in FIG. 17. As a result, the light from the light emitting unit 53*b* reaches the detection unit 53*a* without being blocked by the plate member 54.

That is, when the housing 20 returns from the wiping position P2 to the standby position P1, the state of the detection unit 53*a* is switched from the state of detecting the light from the light emitting unit 53*b* (the state of FIG. 15) to the state of once not detecting the light from the light emitting unit 53*b* (the state of FIG. 16), and then is switched again to the state of detecting the light from the light emitting unit 53*b* (the state of FIG. 17). Therefore, the control unit stops the driving of the motor 43 at the timing when the detection result of the detection unit 53*a* is switched from the state of not detecting light to the state of detecting light. As a result, the housing 20 can be appropriately stopped at the standby position P1.

Figure 18:
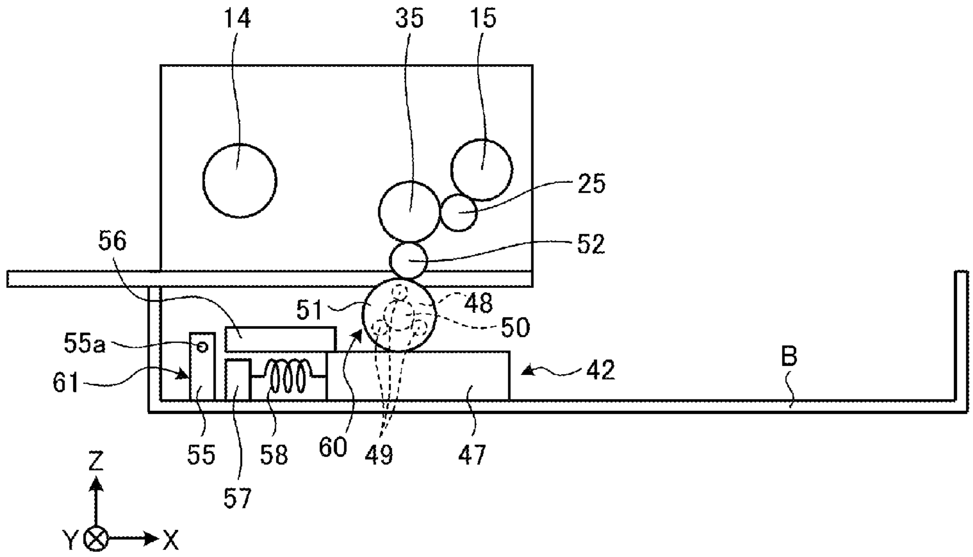
FIG. 18 is a view illustrating an example of a conveyance mechanism.

FIG. 18 is a view illustrating an example of the conveyance mechanism 42. As illustrated in FIGS. 12 and 18, the conveyance mechanism 42 includes a rack gear 47, a pinion gear 48, a planetary gear (relay portion) 49, a sun gear 50, a first transmission gear 51, and a second transmission gear 52.

The rack gear 47 is disposed on the base B and is formed linearly along the X direction. The rack gear 47 has a plurality of teeth 47*a* formed along the X direction on an upper (+Z side) surface. The rack gear 47 is disposed at a predetermined position in the vicinity of the standby position P1 in the base B. The rack gear 47 is provided to be movable in the X direction. The rack gear 47 has an end portion on the −X side connected to an elastic member support portion 57 via an elastic member 58. When force acts on the rack gear 47 in the −X direction and the rack gear 47 moves in the −X direction, the elastic member 58 allows the rack gear 47 to move and applies the elastic force in the +X direction to the rack gear 47. When the force in the X direction is not applied to the rack gear 47, the rack gear 47 maintains the state of being disposed at the predetermined position by the elastic member 58.

Each of the pinion gear 48, the planetary gear 49, the sun gear 50, the first transmission gear 51, and the second transmission gear 52 is supported by the housing 20 so as to be rotatable about the Y axis. The pinion gear 48, the planetary gear 49, the sun gear 50, the first transmission gear 51, and the second transmission gear 52 are movable in the X direction integrally with the housing 20. The planetary gear 49, the sun gear 50, the first transmission gear 51, and the second transmission gear 52 constitute a transmission mechanism 60 that transmits the rotation of the pinion gear 48 to the lid-body-side roller 31.

The pinion gear 48 is disposed at a position corresponding to the rack gear 47 in the X direction and the Y direction. Specifically, when the housing 20 returns from the wiping position P2 to the standby position P1, the rack gear 47 and the pinion gear 48 are arranged such that the teeth 48*a* of the pinion gear 48 mesh with the teeth 47*a* of the rack gear 47 during a period from a position before the standby position P1 to the standby position P1. In this configuration, the teeth 48*a* of the pinion gear 48 mesh with the teeth 47*a* of the rack gear 47 even during the movement in the direction opposite to the above direction, that is, during the movement of the housing 20 from the standby position P1 toward the wiping position P2 until reaching the position beyond the standby position P1 from the movement start position.

The planetary gear 49 is disposed on the −Y side of the pinion gear 48. The sun gear 50 is provided so as to be coaxial with the pinion gear 48. The sun gear 50 has a plurality of teeth 50*a* formed along the circumferential direction on the outer periphery.

Figure 19:
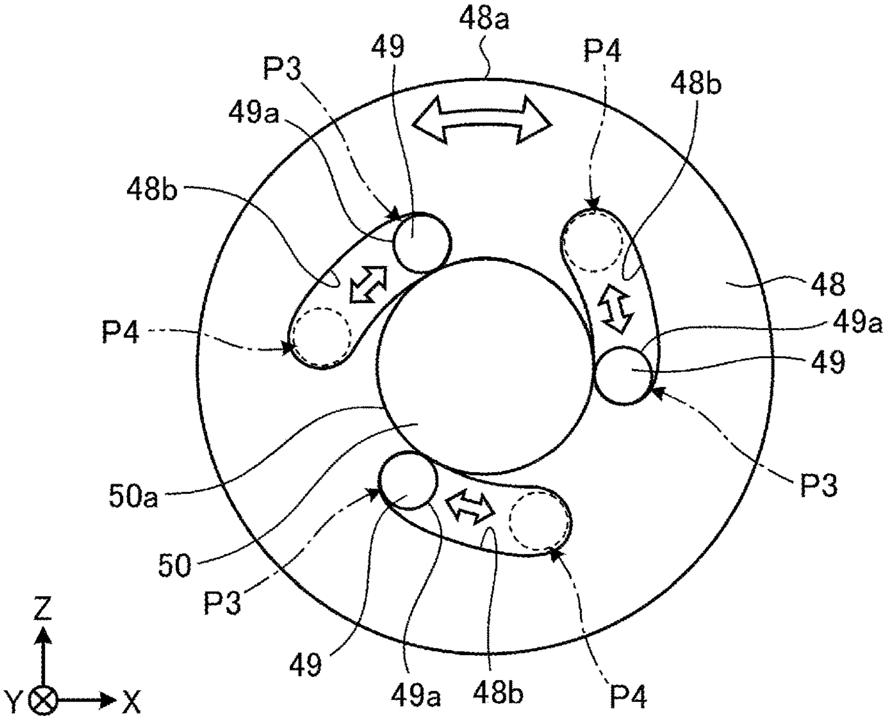
FIG. 19 is a view illustrating an example of the pinion gear and the planetary gear as viewed from the −Y side.
Figure 20:
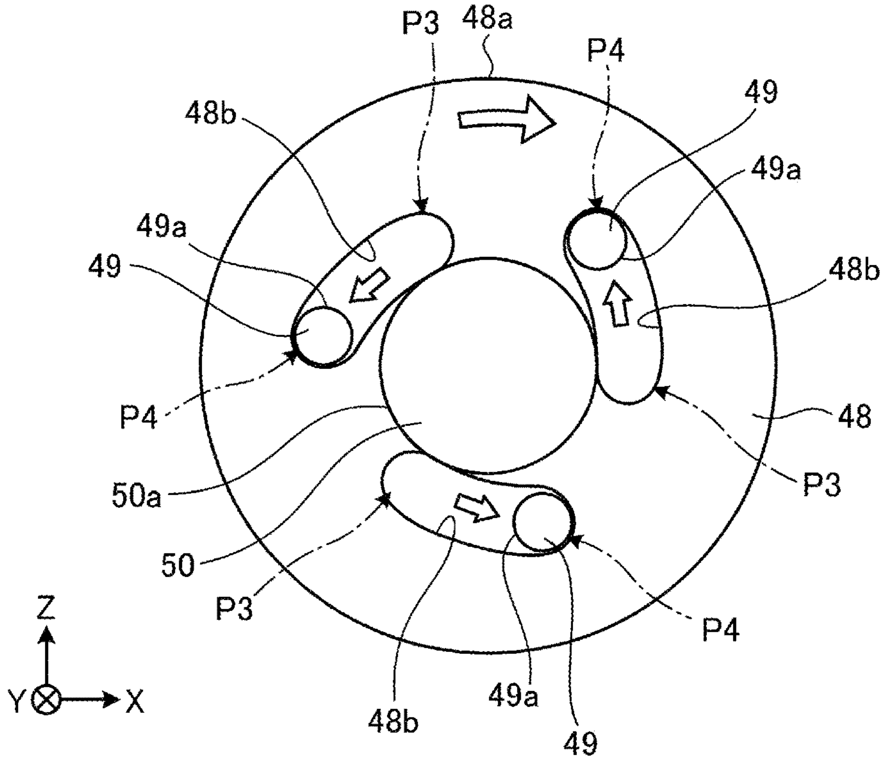
FIG. 20 is a view illustrating an example of the pinion gear and the planetary gear as viewed from the −Y side.
Figure 21:
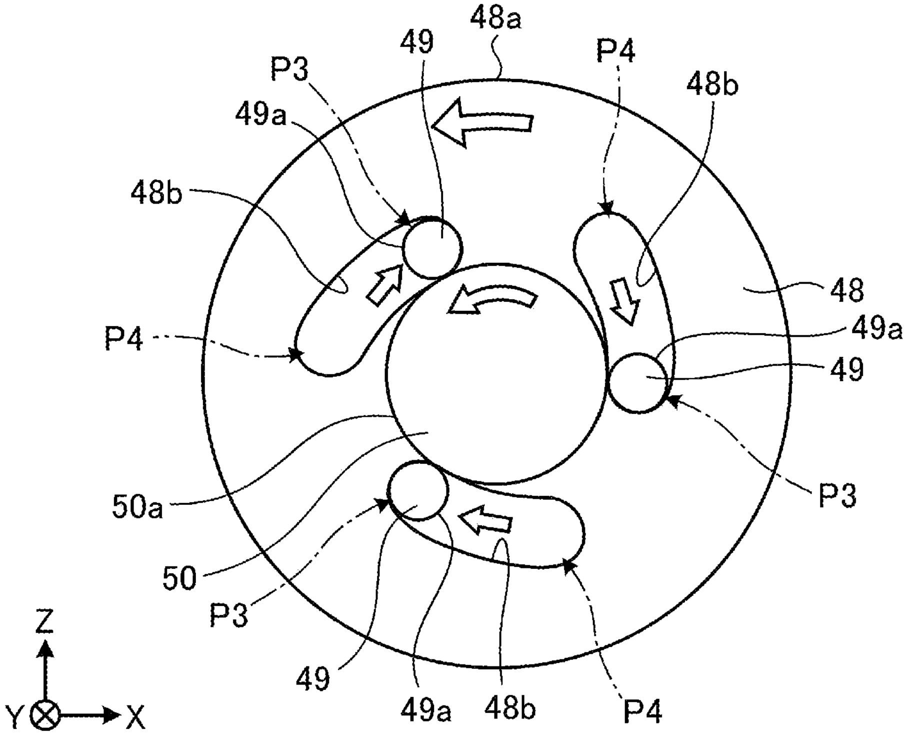
FIG. 21 is a view illustrating an example of the pinion gear and the planetary gear as viewed from the −Y side.

FIGS. 19 to 21 are views illustrating an example of the pinion gear 48 and the planetary gear 49 as viewed from the −Y side. Note that FIGS. 19 to 21 also illustrate the sun gear 50. As illustrated in FIG. 19, the planetary gear 49 is accommodated in a recess 48*b* provided on the −Y side of the pinion gear 48. The recesses 48*b* are disposed at a plurality of places (three places in the present embodiment) along the outer periphery of the sun gear 50. For example, the recess 48*b* is disposed at a position where an end in the clockwise direction in FIG. 19 is in contact with the sun gear 50 side, and an end in the counterclockwise direction is disposed at a position radially away from the sun gear 50.

The planetary gear 49 moves inside the recess 48*b* as the pinion gear 48 rotates. As illustrated in FIG. 20, when the pinion gear 48 rotates clockwise, the planetary gear 49 is disposed at a non-transmission position P4 of the recess 48*b* away from the sun gear 50 along with the rotation of the pinion gear 48. In this case, the teeth 49*a* of the planetary gear 49 do not mesh with the teeth 50*a* of the sun gear 50, and the sun gear 50 does not rotate. Therefore, the rotation of the pinion gear 48 is not transmitted to the lid-body-side roller 31 (non-transmission state).

As illustrated in FIG. 21, when the pinion gear 48 rotates counterclockwise, the planetary gear 49 is disposed at a transmission position P3 in the recess 48*b* in contact with the sun gear 50 along with the rotation of the pinion gear 48. In the present embodiment, the planetary gear 49 disposed at the transmission position P3 only revolves and does not rotate. That is, the arrangement angle of the planetary gear 49 at the transmission position P3 is fixed. The planetary gear 49 may be limited in rotation only at the transmission position P3, or may have a fixed angle at all times. In this case, the teeth 49*a* of the planetary gear 49 mesh with the teeth 50*a* of the sun gear 50, and the sun gear 50 rotates counterclockwise. That is, when meshing with the planetary gears 49, the sun gear 50 rotates in the same direction (counterclockwise direction) as the rotation direction of the pinion gear 48. Therefore, the rotation of the pinion gear 48 is transmitted to the lid-body-side roller 31 (transmission state).

The first transmission gear 51 is fixed to the sun gear 50. The first transmission gear 51 is provided coaxially with the pinion gear 48 and the sun gear 50, and rotates integrally with the sun gear 50. The first transmission gear 51 has a plurality of teeth 51*a* formed along the circumferential direction on the outer periphery.

The second transmission gear 52 is disposed above the first transmission gear 51. A part of the second transmission gear 52 penetrates the bottom of the housing 20 and is disposed inside. The second transmission gear 52 is disposed so as to be rotatable about the Y axis. The second transmission gear 52 has a plurality of teeth 52*a* formed along the circumferential direction on the outer periphery. The second transmission gear 52 is disposed such that the lower side meshes with the first transmission gear 51 and the upper side meshes with the lid body roller gear 35 provided on the lid body 30 described above.

The conveyance mechanism 42 includes an optical sensor 55. The optical sensor 55 includes a detection unit 55*a* that detects light emitted from a light emitting unit 55*b* in the +Y direction. In this case, the light emitting unit 55*b* is disposed on the −Y side of the detection unit 55*a*. The light emitting unit 55*b* may be disposed on the base B or may be disposed at a position different from the base B. Note that the light emitting unit 55*b* may be disposed in the optical sensor 55, and the detection unit 55*a* may detect reflected light of light emitted from the light emitting unit 55*b*.

The rack gear 47 is provided with a light shielding member 56. In a case where the light shielding member 56 is not disposed on the −Y side of the detection unit 55*a*, the light from the light emitting unit 55*b* reaches the detection unit 55*a* and is detected by the detection unit 55*a*. On the other hand, in a case where the light shielding member 56 is disposed on the −Y side of the detection unit 55*a*, the light from the light emitting unit 55*b* is shielded by the light shielding member 56 and does not reach the detection unit 55*a*. The detection result of the detection unit 55*a* is supplied to the control unit. As will be described later, the optical sensor 55 and the light shielding member 56 constitute a detection mechanism 61 that detects that the rotation of the lid-body-side roller 31 is restricted.

Figure 22:
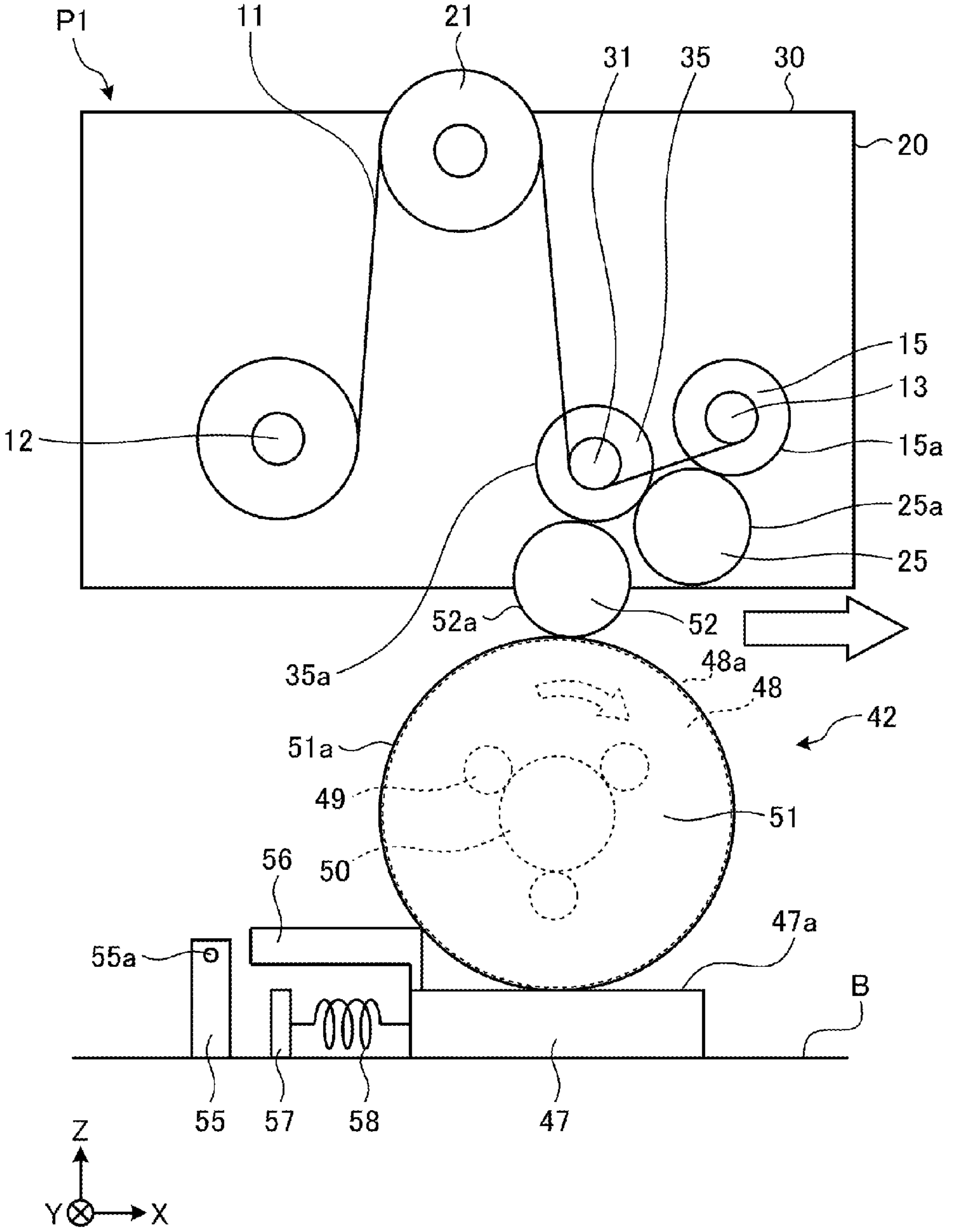
FIG. 22 is a view illustrating an example of an operation of the conveyance mechanism.
Figure 23:
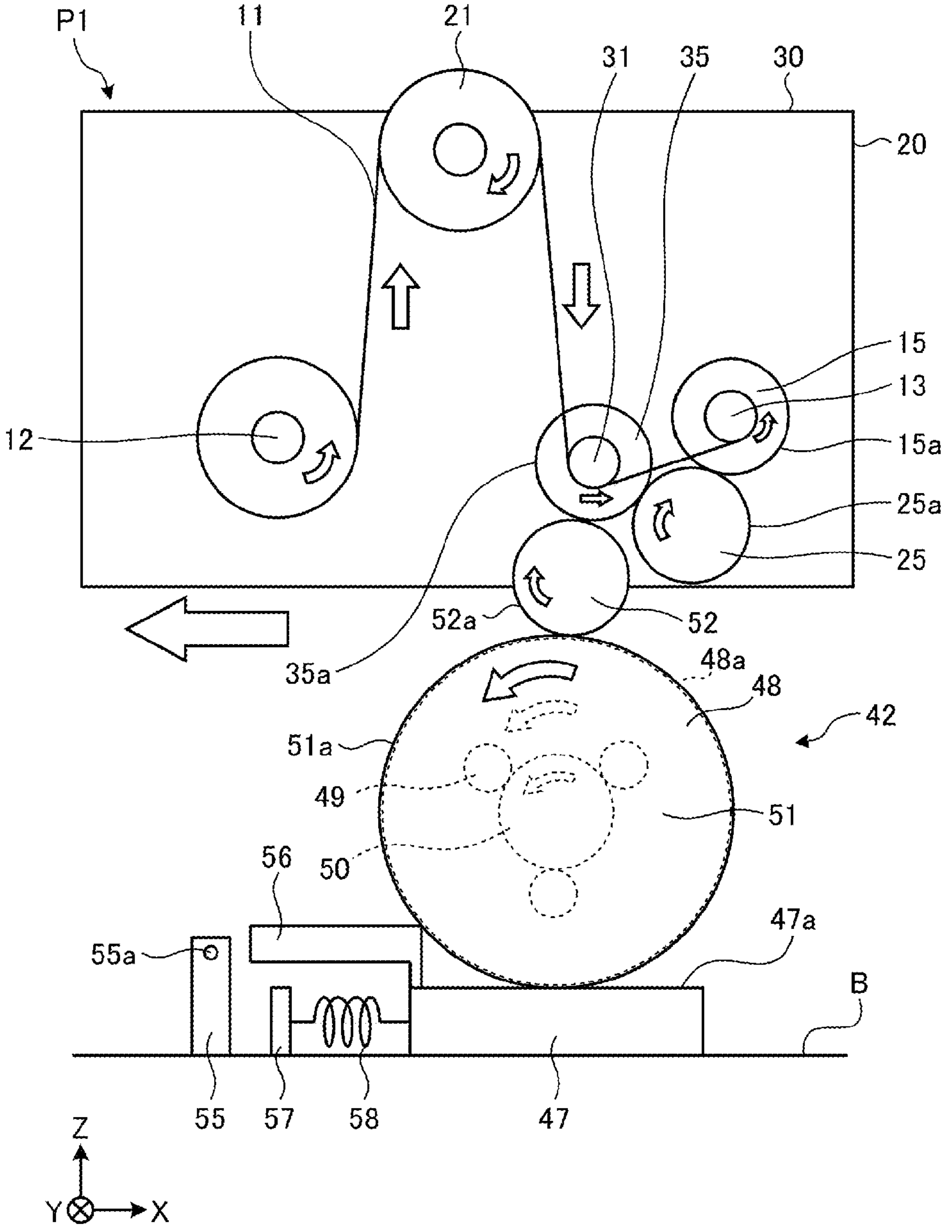
FIG. 23 is a view illustrating an example of an operation of the conveyance mechanism.
Figure 24:
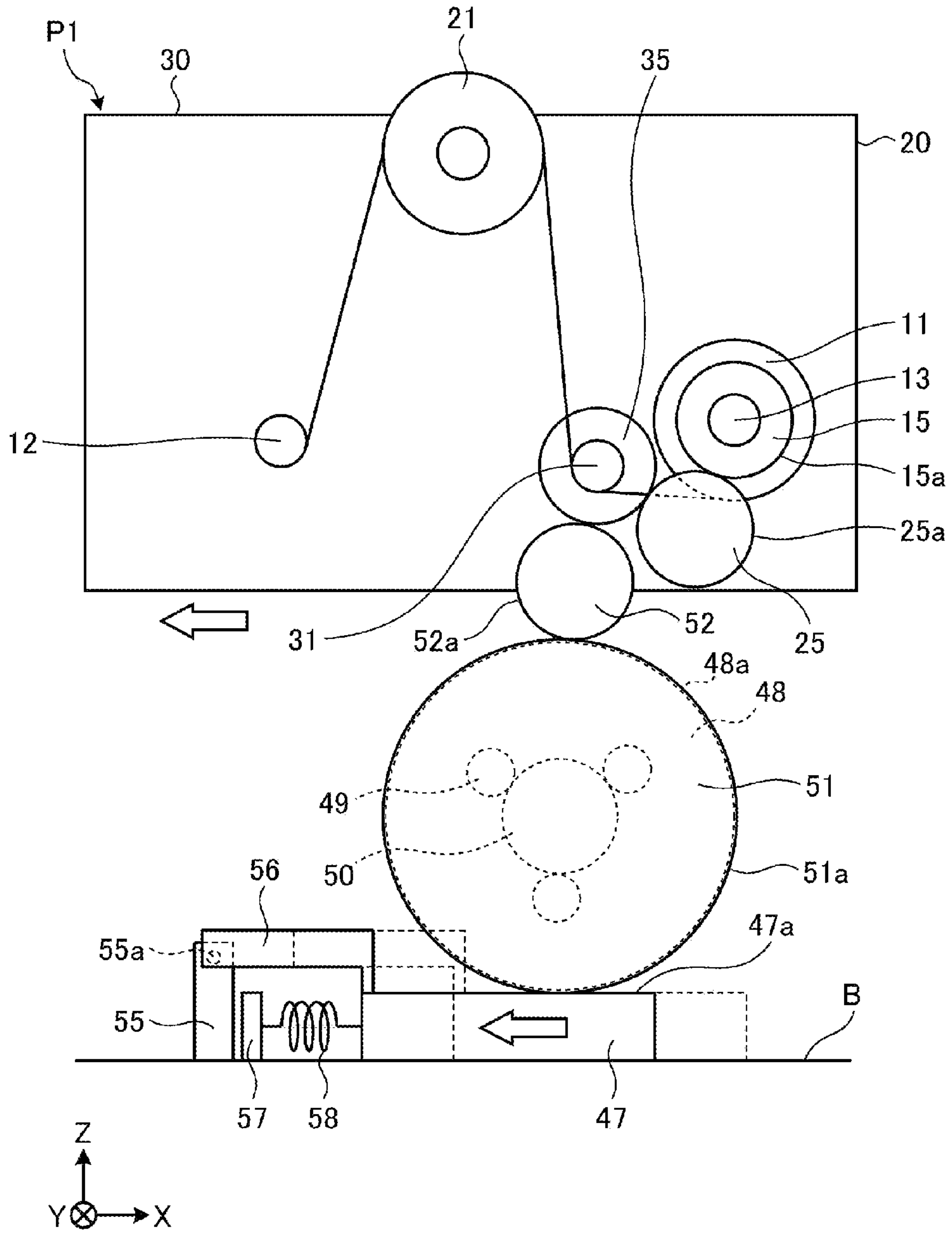
FIG. 24 is a view illustrating an example of an operation of the conveyance mechanism.

FIGS. 22 to 24 are views illustrating an example of the operation of the conveyance mechanism 42. FIGS. 22 to 24 illustrate a state viewed from the −Y side. As illustrated in FIG. 22, when the housing 20 moves from the standby position P1 to the wiping position P2, the teeth 48*a* of the pinion gear 48 mesh with the teeth 47*a* of the rack gear 47, and the pinion gear 48 rotates in the clockwise direction. When the pinion gear 48 rotates in the clockwise direction, the planetary gear 49 is disposed at the non-transmission position P4 away from the sun gear 50 in the recess 48*b*. Therefore, the teeth 49*a* of the planetary gear 49 do not mesh with the teeth 50*a* of the sun gear 50, and the sun gear 50 does not rotate. Therefore, the transmission mechanism 60 is in the non-transmission state, and the wiping body 11 is not conveyed.

As illustrated in FIG. 23, when the housing 20 returns from the wiping position P2 to the standby position P1, the teeth 48*a* of the pinion gear 48 mesh with the teeth 47*a* of the rack gear 47 before reaching the standby position P1 from the position before the standby position P1, and the pinion gear 48 rotates counterclockwise. When the pinion gear 48 rotates in the counterclockwise direction, the planetary gear 49 is disposed at the transmission position P3 in contact with the sun gear 50. Therefore, the teeth 49*a* of the planetary gear 49 mesh with the teeth 50*a* of the sun gear 50, and the sun gear 50 rotates counterclockwise. Therefore, the transmission mechanism 60 is in the transmission state.

When the sun gear 50 rotates counterclockwise, the first transmission gear 51 rotates counterclockwise integrally with the sun gear 50. Therefore, the second transmission gear 52 rotates clockwise, and the lid body roller gear 35 meshing with the second transmission gear 52 rotates counterclockwise. The rotation of the lid body roller gear 35 rotates the lid-body-side roller 31, and the wiping body 11 is conveyed toward the winding roller 13. By the rotation of the lid-body-side roller 31, tension is generated in the wiping body 11, and the feeding roller 12 rotates counterclockwise, that is, in a direction in which the wiping body 11 is fed out. Thus, the wiping body 11 is fed out by a predetermined length from the feeding roller 12.

With the rotation of the lid body roller gear 35, the transmission gear 25 meshing with the lid body roller gear 35 rotates clockwise, and the winding-side gear 15 meshing with the transmission gear 25 rotates counterclockwise. By the rotation of the winding-side gear 15, the winding roller 13 rotates counterclockwise and rotates in the direction of winding the wiping body 11. Thus, the wiping body 11 conveyed from the lid-body-side roller 31 is wound by the winding roller 13.

As illustrated in FIG. 24, when the winding roller 13 has wound the entire wiping body 11, the wiping body 11 is stretched between the feeding roller 12 and the winding roller 13. Therefore, the rotation of the winding roller 13 is restricted, and the winding-side gear 15 does not rotate. Accordingly, the transmission gear 25, the lid body roller gear 35, the second transmission gear 52, the first transmission gear 51, the sun gear 50, the planetary gear 49, and the pinion gear 48 which directly or indirectly mesh with the winding-side gear 15 do not rotate while meshing with each other.

Therefore, when the housing 20 tries to move in the −X direction, the rack gear 47 moves in the −X direction integrally with the housing 20 including the pinion gear 48 while meshing with the pinion gear 48. When the housing 20 moves to the standby position P1, the elastic member 58 contracts due to the movement of the rack gear 47, and the light shielding member 56 is disposed on the +Y side of the detection unit 55*a* of the optical sensor 55. Therefore, the light from the light emitting unit 55*b* is shielded by the light shielding member 56 and does not reach the detection unit 55*a*. The control unit can determine the timing to replace the wiping unit 10 based on the detection result of the detection unit 55*a* of the optical sensor 55. That is, when the state in which the light from the light emitting unit 55*b* is detected by the detection unit 55*a* is switched to the state in which the light is not detected, it can be determined that the timing to replace the wiping unit 10 has come. The control unit can output or notify the determination result. In this manner, the optical sensor 55 and the light shielding member 56 constitute the detection mechanism 61 that detects that the rotation of the lid-body-side roller 31 is restricted.

As described above, the wiper unit 100 according to the present embodiment includes: the wiping unit 10 having the roll-shaped wiping body 11; the housing 20 that has the opening 20*a* in the upper portion through which the wiping unit 10 can be taken in and out, has the housing-side roller 21 disposed such that a part thereof protrudes upward from the opening 20*a*, and accommodates the wiping unit 11 in a state where a part of the wiping unit 10 is hooked on the housing-side roller 21 from the upper side; and the lid body 30 that covers the opening 20*a* so as to expose the wiping body 11 hooked on the housing-side roller 21 to the outside, and has the lid-body-side roller 31 that conveys the wiping body 11 in a state where the opening 20*a* is covered.

With this configuration, the wiping unit 10 can be taken in and out of the housing 20 from the opening 20*a*. Therefore, since the wiping unit 10 can be replaced alone without handling the configuration necessary for the wiping operation in units of cassettes, the running cost can be suppressed.

In the wiper unit 100 according to the present embodiment, the wiping unit 10 includes the feeding roller 12 that is rotatably supported by the housing 20, to which the proximal end of the wiping body 11 is fixed, and that feeds out the wiping body 11 to the housing-side roller 21, and the winding roller 13 that is rotatably supported by the housing 20, to which the distal end of the wiping body 11 is fixed, and that winds the wiping body 11 from the housing-side roller 21. With this configuration, the wiping unit 10 integrated with the wiping body 11, the feeding roller 12, and the winding roller 13 is taken in and out, so that replacement can be easily performed.

In the wiper unit 100 according to the present embodiment, the winding roller 13 includes the winding-side gear 15 rotatable integrally with the winding roller 13, and the lid-body-side roller 31 includes the lid body roller gear 35 that rotates integrally with the lid-body-side roller 31 and is connected to rotate in conjunction with the winding-side gear 15. With this configuration, the conveyance operation of the wiping body 11 by the lid-body-side roller 31 and the winding operation of the wiping body 11 by the winding roller 13 can be interlocked.

In the wiper unit 100 according to the present embodiment, the housing 20 further includes the rack gear 47 movable in a predetermined direction and arranged along the predetermined direction, the pinion gear 48 meshing with the rack gear 47, and the transmission mechanism 60 capable of transmitting the rotation of the pinion gear 48 to the lid body roller gear 35. With this configuration, the movement of the housing 20 can be interlocked with the conveyance operation and the winding operation of the wiping body 11.

In the wiper unit 100 according to the present embodiment, the wiping body 11 is a nonwoven fabric. As a result, the wiping operation can be efficiently performed.

In the wiper unit 100 according to the present embodiment, the lid body 30 is mounted to the housing 20 via the hinge 32. Thus, the opening and closing operation of the lid body 30 can be easily performed.

The wiper unit 100 according to the present embodiment includes the wiping body 11 extending in a band shape, the housing 20 on which the wiping body 11 is placed and provided to be movable in a predetermined direction, the moving mechanism 41 that moves the housing 20 in the predetermined direction, and the transmission mechanism 60 that transmits the moving force of the housing 20 in the predetermined direction and converts the moving force into the moving force of moving the wiping body 11.

With this configuration, the movement of the housing 20 and the conveyance operation and the winding operation of the wiping body 11 can be interlocked by the transmission mechanism 60. Therefore, it is possible to provide the wiper unit 100 capable of simplifying the mechanism.

In the wiper unit according to the present embodiment, the housing 20 includes the lid-body-side roller 31 that conveys the wiping body 11 by rotation, the conveyance mechanism 42 includes the rack gear 47 arranged along a predetermined direction and the pinion gear 48 that meshes with the rack gear 47, and the transmission mechanism 60 can transmit the rotation of the pinion gear 48 to the lid-body-side roller 31.

In the wiper unit 100 according to the present embodiment, the transmission mechanism 60 includes a relay portion capable of switching between a transmission state in which the rotation of the pinion gear 48 is transmitted to the lid-body-side roller 31 and a non-transmission state in which the rotation of the pinion gear 48 is not transmitted to the lid-body-side roller 31. With this configuration, it is possible to switch between a state in which the conveyance operation and the winding operation of the wiping body 11 are performed and a state in which the conveyance operation and the winding operation of the wiping body 11 are not performed.

In the wiper unit 100 according to the present embodiment, the transmission mechanism 60 transmits the rotation to the lid-body-side roller 31 so as to convey the wiping body 11 in one direction. With this configuration, the wiping body 11 can be efficiently conveyed and used.

In the wiper unit 100 according to the present embodiment, the transmission mechanism 60 includes the planetary gear 49 disposed at the transmission position P3 at which the rotation of the pinion gear 48 is transmitted to the lid-body-side roller 31 when the pinion gear 48 rotates in the first direction, and disposed at the non-transmission position P4 at which the planetary gear 48 does not mesh with the pinion gear 48 when the pinion gear rotates in the second direction opposite to the first direction, and the relay portion is the planetary gear 49. In this configuration, the planetary gear 49 can efficiently switch between the transmission state and the non-transmission state.

In the wiper unit 100 according to the present embodiment, the housing 20 moves in a predetermined direction between the standby position P1 and the wiping position P2 where the wiping operation is performed, the first direction is a rotation direction when the housing 20 moves from the wiping position P2 to the standby position P1, and the second direction is a rotation direction when the housing 20 moves from the standby position P1 to the wiping position P2. With this configuration, the wiping body 11 is conveyed when the housing 20 returns to the standby position P1. Therefore, when the wiping position P2 is moved next time, a stable operation can be performed.

In the wiper unit 100 according to the present embodiment, the lid-body-side roller 31 further includes the detection mechanism 61 that detects that the rotation is restricted when the wiping body 11 is fed out to the proximal end and that the rotation of the lid-body-side roller 31 is restricted. With this configuration, the replacement timing of the wiping unit 10 can be efficiently detected.

The technical scope of the present invention is not limited to the above embodiment, and can be appropriately changed without departing from the gist of the present invention. For example, in the above embodiment, the configuration in which the conveyance mechanism 42 includes the rack gear 47 and the pinion gear 48 and the transmission mechanism 60 transmits the rotation of the pinion gear 48 to the lid-body-side roller 31 has been described as an example, but the present invention is not limited thereto. Other configurations may be adopted as long as the transmission mechanism transmits the moving force of the housing 20 in the predetermined direction and can convert the moving force into the moving force for moving the wiping body 11.

The invention claimed is:

1. A wiper unit comprising:

a wiping body extending in a band shape;

a housing on which the wiping body is placed and which is provided so as to be movable in a predetermined direction;

a drive mechanism that moves the housing in the predetermined direction; and a transmission mechanism that converts a moving force of the housing in the predetermined direction into a moving force for moving the wiping body, wherein the housing is configured to move in the predetermined direction between a standby position and a wiping position where a wiping operation is performed, the housing includes a conveying roller that conveys the wiping body by rotation via fixing a tip of the wiping body, a conveyance mechanism includes a rack gear disposed along the predetermined direction and a pinion gear meshing with the rack gear, the transmission mechanism is capable of transmitting rotation of the pinion gear to the conveying roller, the rotation of the conveying roller is restricted when the wiping body is fed to a proximal end, the rack gear is configured to be movable in the predetermined direction to a side opposite to the wiping position, an end opposite to the wiping position in the predetermined direction is connected to an elastic member support portion via an elastic member, the elastic member is configured in a state of applying an elastic force to the rack gear in the predetermined direction to a side of the wiping position, wherein the wiper unit further comprises a detection mechanism configured to detect a movement of the rack gear in a case when the housing is moved integrally with the rack gear via the rack gear in the predetermined direction to the side opposite to the wiping position while in a state where a rotation of the conveying roller is restricted.

2. The wiper unit as set forth in claim 1, wherein the transmission mechanism includes a relay portion capable of switching between a transmission state in which rotation of the pinion gear is transmitted to the conveying roller and a non-transmission state in which rotation of the pinion gear is not transmitted to the conveying roller.

3. The wiper unit as set forth in claim 1, wherein the transmission mechanism transmits rotation to the conveying roller so as to convey the wiping body in one direction.

4. The wiper unit as set forth in claim 3, wherein the transmission mechanism includes a planetary gear disposed at a transmission position at which rotation of the pinion gear is transmitted to the conveying roller when the pinion gear rotates in a first direction, and disposed at a non-transmission position at which the planetary gear does not mesh with the pinion gear when the pinion gear rotates in a second direction opposite to the first direction, and the relay portion is the planetary gear.

5. The wiper unit as set forth in claim 4, wherein the first direction is a rotation direction when the housing moves from the wiping position to the standby position, and the second direction is a rotation direction when the housing moves from the standby position to the wiping position.

* * * * *